Sept. 8, 1931.     E. R. GURNEY     1,822,143
AXLE AND FINAL DRIVE FOR VEHICLES
Filed July 26, 1930     2 Sheets-Sheet 1

INVENTOR
Erving R. Gurney,
BY Redding, Greeley, O'Shea & Campbell
THEIR ATTORNEYS Sept. 8, 1931.  E. R. GURNEY  1,822,143
AXLE AND FINAL DRIVE FOR VEHICLES
Filed July 26, 1930  2 Sheets-Sheet 2
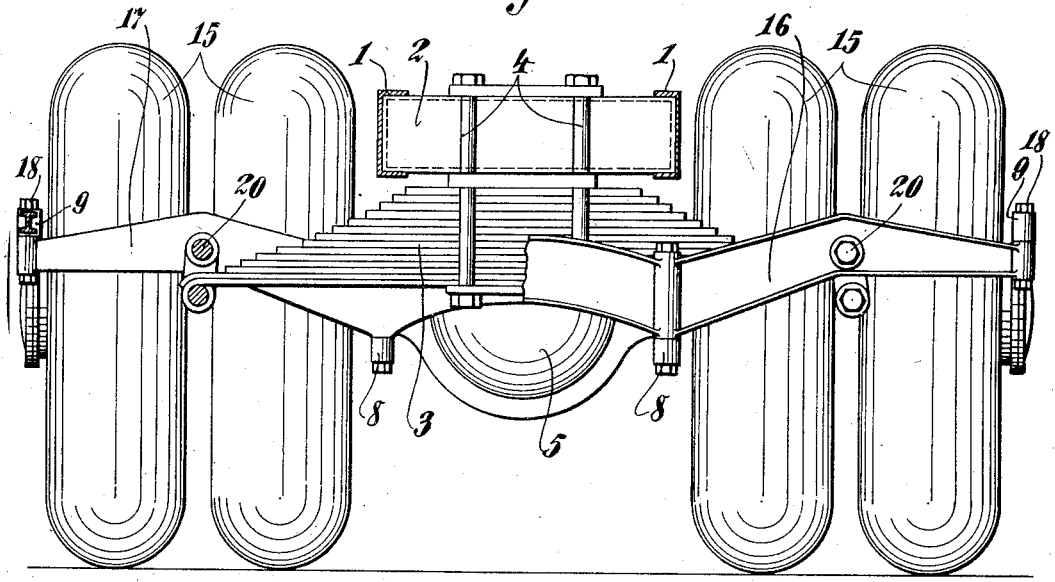
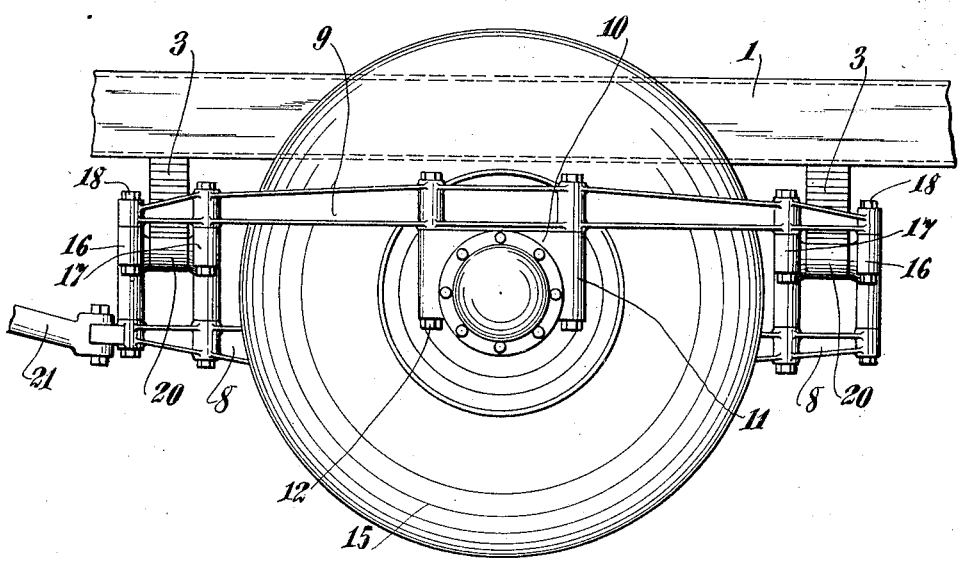
INVENTOR
Erving R. Gurney,
BY
Redding, Greeley, O'Shea & Campbell
THEIR ATTORNEYS Patented Sept. 8, 1931

1,822,143

UNITED STATES PATENT OFFICE

ERVING R. GURNEY, OF ALLENTOWN, PENNSYLVANIA, ASSIGNOR TO INTERNATIONAL MOTOR COMPANY, OF NEW YORK, N. Y., A CORPORATION OF DELAWARE

AXLE AND FINAL DRIVE FOR VEHICLES

Application filed July 26, 1930. Serial No. 470,812.

The present invention relates to spring suspensions for motor vehicles and embodies, more specifically, an improved spring suspension for a motor vehicle upon which dual tires are mounted, the size of such tires being relatively great. In order to provide a construction capable of carrying a desired load, without employing two driving axles, it frequently is desirable to utilize dual tires upon either end of a single axle. Where these tires are of comparatively large size, the overall width of the vehicle becomes great and frequently exceeds the maximum width allowed by law. Narrowing the frame, that is spacing the frame members closer together, causes a greater overhang of the ends of the axle and places the springs inwardly toward the median plane of the frame, thus producing a relatively unstable body. The lack of lateral stability resulting therefrom is quite objectionable and places a distinct limitation upon the construction of motor vehicles of this type.

An object of the present invention is to provide a motor vehicle having a driving axle upon the ends of which dual tires of relatively great width are utilized.

A further object of the invention is to provide a device of the above character which is adapted for use in connection with shaft driven vehicles as distinguished from chain driven vehicles.

A further object of the invention is to provide a spring suspension for motor vehicles of the above type, wherein dual tires of relatively great width may be utilized without impairing the stability of the frame.

A further object of the invention is to provide a device of the above character, wherein the changing of tires may be readily effected without dismounting the axle, frame or driving members of the vehicle.

Further objects, not specifically enumerated above, will be apparent as the invention is described in greater detail in connection with the accompanying drawings, wherein:

Figure 2 is a view in rear elevation, partly broken away and in section, showing the device of Figure 1.

Figure 3 is a view in side elevation, showing the construction of Figure 1.

Figure 1:
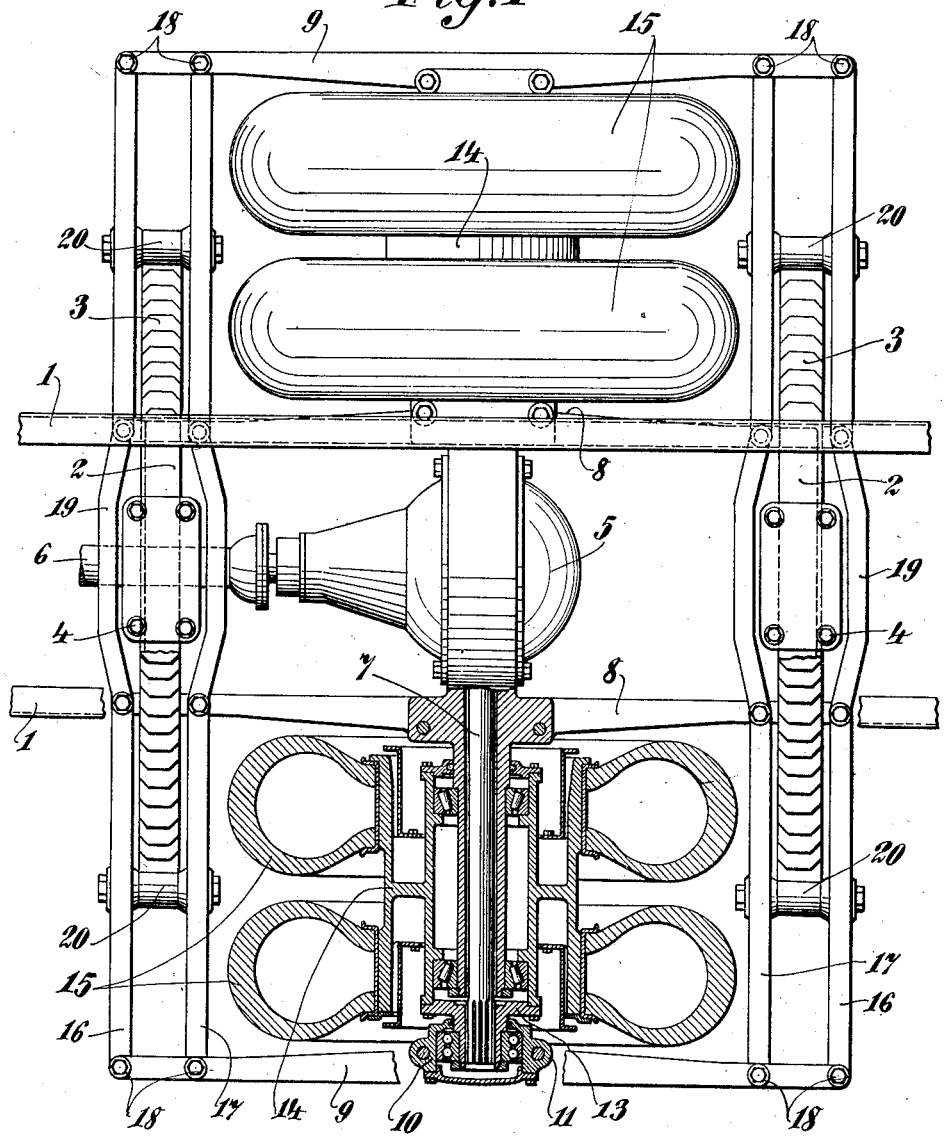
Figure 1 is a plan view, partly broken away, and in section, showing a device constructed in accordance with the present invention.

Referring to the above drawings, the frame members of a motor vehicle are shown at 1, these frame members extending longitudinally of the vehicle and provided with spaced cross members 2. Secured to the underside of cross members 2 are spaced transverse springs 3 which are secured to the members by means of bolts 4.

An axle 5 is provided, this axle being formed as a banjo-type axle for receiving the final drive elements in the usual manner. Propeller shaft 6 supplies power to a differential within the banjo of the axle which, in turn, apportions power between jack shafts 7.

Longitudinally extending parallel arms or bars 8 may be formed on or secured to the axle 5, these arms lying in parallel vertical planes which are parallel to the frame members 1. Parallel supporting bars 9 are mounted on ball bearing cages 10 which are formed with bosses 11 through which bolts 12 pass. The bolts extend through arms 9 and thus secure such arms to the ball bearing cages 10. The ball bearing cages are journaled upon hubs formed on driving flanges 13, the latter being secured to the hub of a wheel 14 in any desired fashion. The wheel hub receives suitable tires 15 which are secured in position by any means now common in the art.

Cross bars 16 and 17 are secured in spaced relationship to the ends of the supporting bars 8 and 9 by means of bolts 18. The central portion of the cross bars 16 are preferably bowed outwardly as at 19 to receive the spring mounting means, as clearly shown in Figure 1.

When the bolts 18 are removed, the bars 9 may be removed and the tires readily changed. The support bars 8 maintain the axle in alignment with the frame work including the bars 16 and 17 and support the load of the vehicle upon the axle to permit the replacement of the bars 9 as will be readily apparent. As the load is carried by means of bars 8 and 9 close to the wheel bearings adjacent the driving flanges 13, the banjo part of the axle may be made comparatively light since it carries none of the chassis load and acts only as a stabilizer when turning corners or on a side slope.

Inasmuch as the central portions of the cross bars 16 and 17 carry practically none of the load, these portions may be made comparatively light, the outer portions thereof between the supporting bars 8 and 9 supporting the entire load by reason of the connection 20 between the ends of springs 3 and the outer portions of the bars 16 and 17.

All of the driving and braking torque is taken by the springs, such torque being transmitted to the springs in a direction lying in the planes thereof, thus not impressing deleterious stresses on the springs. The drive is transmitted to the frame through a suitable radius rod 21 and the brake anchors and operating means may be conveniently attached to the bars 8 and 9, the construction of the various bars being alike to increase the interchangeability of parts and standardize the manufacture thereof.

From the foregoing, it will be apparent that a spring mounting has been provided, the elements of which are simple of construction and of great strength, whereby the parts may be taken down and assembled readily to facilitate the inspection and maintenance thereof as well as the changing of tires, etc. While the invention has been described with specific reference to the accompanying drawings, it is not to be limited, save as defined in the appended claims.

I claim as my invention:

1. A frame, an axle, a wheel mounted upon the axle, spaced springs mounted transversely of the frame, spaced pairs of supporting members extending transversely of the frame, means to mount the members on the springs with the springs lying between the respective members, an inner longitudinal supporting member secured at its ends to the transverse members and mounting the axle, an outer longitudinal supporting member, means to journal the axle in the outer member, and means to mount the outer member removably.

2. A frame, an axle, a wheel mounted upon the axle, spaced springs mounted transversely of the frame, spaced pairs of supporting members extending transversely of the frame, means to mount the members on the springs with the springs lying between the respective members, an inner longitudinal supporting member secured at its ends to the transverse members and mounting the axle, and an outer longitudinal supporting member mounting the axle and secured at its ends to the transverse members.

3. A frame, an axle, a wheel mounted upon the axle, spaced springs mounted transversely of the frame, a plurality of spaced supporting members extending transversely of the frame, means to mount the members on the springs, the springs lying between the respective spaced transverse members, longitudinal supporting members secured to the transverse members, and means to mount the axle on the longitudinal members with the wheel between such members.

This specification signed this 22 day of July A. D. 1930.

ERVING R. GURNEY.